(12) United States Patent
Geng

(10) Patent No.: US 9,660,242 B2
(45) Date of Patent: May 23, 2017

(54) ELECTRODE BOARD HAVING SECURITY DEVICE AND POWER BATTERY SYSTEM USING SAME

(75) Inventor: De-xian Geng, Shenzhen (CN)

(73) Assignee: OPTIMUM BATTERY CO., LTD., Shenzhen (CN)

( * ) Notice: Subject to any disclaimer, the term of this patent is extended or adjusted under 35 U.S.C. 154(b) by 972 days.

(21) Appl. No.: 13/443,898

(22) Filed: Apr. 11, 2012

(65) Prior Publication Data

US 2013/0034751 A1    Feb. 7, 2013

(30) Foreign Application Priority Data

Aug. 5, 2011   (CN) .......................... 2011 1 0223748
Sep. 22, 2011  (CN) .......................... 2011 1 0283291

(51) Int. Cl.

| H01M 2/34 | (2006.01) |
|---|---|
| H01M 2/20 | (2006.01) |
| H01M 10/02 | (2006.01) |
| H01M 10/42 | (2006.01) |
| H01M 10/052 | (2010.01) |
| H01M 6/42 | (2006.01) |

(52) U.S. Cl.
CPC ............. *H01M 2/206* (2013.01); *H01M 2/34* (2013.01); *H01M 10/02* (2013.01); *H01M 10/4207* (2013.01); *H01M 6/42* (2013.01); *H01M 10/052* (2013.01); *H01M 2200/103* (2013.01); *H01M 2220/20* (2013.01); *Y02E 60/122* (2013.01)

(58) Field of Classification Search
CPC ........... H01M 10/052; H01M 10/4207; H01M 10/02; H01M 2/34; H01M 2/101; H01M 2/206; H01M 6/42; H01M 2200/103; H01M 2220/103; H01M 2/022; H01M 2/1077; H01M 2/1083; H01M 2220/20
USPC .............................. 429/7, 82, 157, 158, 159
See application file for complete search history.

(56) References Cited

U.S. PATENT DOCUMENTS

| 5,939,217 A * | 8/1999 | Tamura ............... H01M 2/1241 429/53 |
|---|---|---|
| 6,377,432 B1 * | 4/2002 | Hashimoto .................... 361/104 |
| 2004/0066478 A1 * | 4/2004 | Farquhar et al. ............. 349/117 |
| 2005/0031945 A1 * | 2/2005 | Morita et al. .................. 429/158 |
| 2010/0075181 A1 * | 3/2010 | Niessen et al. .................... 429/9 |
| 2010/0266891 A1 * | 10/2010 | Kwon et al. .................. 429/159 |
| 2011/0171504 A1 * | 7/2011 | Yasui et al. ..................... 429/53 |
| 2011/0171505 A1 * | 7/2011 | Kishll et al. .................... 429/82 |
| 2011/0177365 A1 * | 7/2011 | Yasui et al. ..................... 429/61 |
| 2013/0122341 A1 * | 5/2013 | De Paoli et al. ............... 429/99 |

* cited by examiner

*Primary Examiner* — Carlos Barcena (57) ABSTRACT

A power battery system includes a number of parallel groups that being connected in series and a number of improved electrode boards. Each of the parallel groups comprising a number of single batteries connected in parallel. Each of the improved electrode boards being connected between two neighbored parallel groups. Each of the improved electrode boards includes a number of electrode contact plate, a conductive substrate, and a number of security devices. Each electrode contact plate connects two neighbored single batteries of two neighbored parallel groups in series. Each of the security devices corresponds to an electrode connection plate and electrically connects an electrode connection plate to the conductive substrate. Each of the security devices fuses when one of the single batteries of a parallel group occurs short circuit.

6 Claims, 13 Drawing Sheets

ELECTRODE BOARD HAVING SECURITY DEVICE AND POWER BATTERY SYSTEM USING SAME

BACKGROUND OF THE INVENTION

Field of the Invention

This invention relates to power battery systems, and more particular, to an electrode board having security devices and a power battery system using the electrode board.

Description of the Related Art

As a new type of batteries, lithium iron phosphate batteries have being rapidly developed in recent years. The lithium iron phosphate batteries are widely employed as powers for vehicles such as cars and buses.

In order to provide a desirable output voltage and output current, a power battery system employed in a vehicle usually includes a number of single lithium iron phosphate batteries. Generally, the power battery system can be arranged in two arrangements. In a first arrangement, all of the single batteries of the power battery system can be arranged in a number of parallel groups that are connected in series. Each of the parallel groups includes a number of batteries connected in parallel. In a second arrangement, all of the single batteries of the power battery system can be arranged in a number of series groups that are connected in parallel. Each of series groups includes a number of batteries connected in series.

For the first arrangement of the power battery system, each single battery of each parallel group can be balanced by the other single batteries in the same parallel group and usually is in accordance with the other single batteries in the same parallel group. However, when one single battery of one parallel group occurs short circuit, it is served as a load of the other single batteries in the same parallel group, resulting in the other single batteries in the same parallel group discharging the single battery occurred short circuit, which may bring serious consequence.

For the second arrangement of the power battery system, when one single battery of one series group occurs short circuit, the other series groups discharge power to the single batteries occurred short circuit through return circuits formed between the series groups. When the series group in which the single battery occurred short circuit reaches a rated voltage, the other series group will stop discharging. It is difficult to balance each series group of single batteries with other series groups of single batteries. To balance the each series group of single batteries, a parallel branch circuit can be connected to each series group in parallel. However, this brings other problems, for instance, when one single battery of one series group occurs short circuit, the series group will be shorted circuit by the parallel branch circuit connected to the series group in parallel, the other series groups will quickly discharge the single battery occurred short circuit, the temperature of the single battery occurred short circuit will quickly rise, this may resulting in explosion and insecurity to use the power battery system.

In addition, when an electric bus or an electrical car runs, fiercely vibration usually happens to the power battery system equipped in the electric bus or the electrical car runs. The power battery system arranged in the first arrangement does not have any anti-vibration structure.

It is desirable to provide an invention, which can overcome the problems and limitations mentioned above.

SUMMARY OF THE INVENTION

The present invention is directed to an improved electrode board and a power battery system that substantially obviates one or more of the problems due to limitations and disadvantages of the related art.

In an aspect of the present invention, there is provided a power battery system including a number of parallel groups that being connected in series and a number of electrode boards. Each of the parallel groups comprising a number of single batteries connected in parallel. Each of the electrode boards is electrically connected between two neighbored parallel groups. Each of the electrode boards includes a number of electrode contact plate, a conductive substrate, and a number of security devices. Each electrode contact plate electrically connects two neighbored single batteries of two neighbored parallel groups of single batteries in series. Each of the security devices corresponds to an electrode contact plate and electrically connects an electrode contact plate to the conductive substrate. Each of the security devices fuses when one single batteries of one parallel group occurs short circuit.

In another aspect of the present invention, there is provided a power battery system including a number of electrode boards and a number of parallel groups that being connected in series. Each of the parallel groups includes a number of single batteries connected in parallel. Each of the electrode boards includes a number of electrode contact plate, a conductive substrate, and a number of security devices. Each of the electrode boards is electrically connected between two neighbored parallel groups of single batteries. Each electrode contact plate is configured for being connected two neighbored single batteries of two neighbored parallel group in series. Each of the security devices corresponds to an electrode contact plate and electrically connects an electrode contact plate to the conductive substrate. Each of the security devices fuses when one of the single batteries of one parallel group of single batteries occurs short circuit.

In another aspect of the present invention, there is provided an electrode board for being electrically connecting two neighbored parallel groups. The electrode board includes a number of electrode contact plate, a conductive substrate, and plurality of security devices. Each electrode contact plate is configured for being connected to two neighbored single batteries of two neighbored parallel groups in series. Each of the security devices corresponds to an electrode contact plate and electrically connects an electrode connection plate to the conductive substrate. Each of the security devices will fuse when one of the single batteries of one parallel group of single batteries occur short circuit.

It is to be understood that both the foregoing general description and the following detailed description are exemplary and explanatory and are intended to provide further explanations of the invention as claimed.

BRIEF DESCRIPTION OF THE DRAWINGS

FIG. 11 is a partial enlarging schematic of circle A of FIG. 7. FIG. 13 is a partial enlarging schematic of circle C of FIG. 7.

FIG. 12 is a partial enlarging schematic of circle B of FIG. 8.

DETAILED DESCRIPTION OF THE PREFERRED EMBODIMENTS

Figure 1:
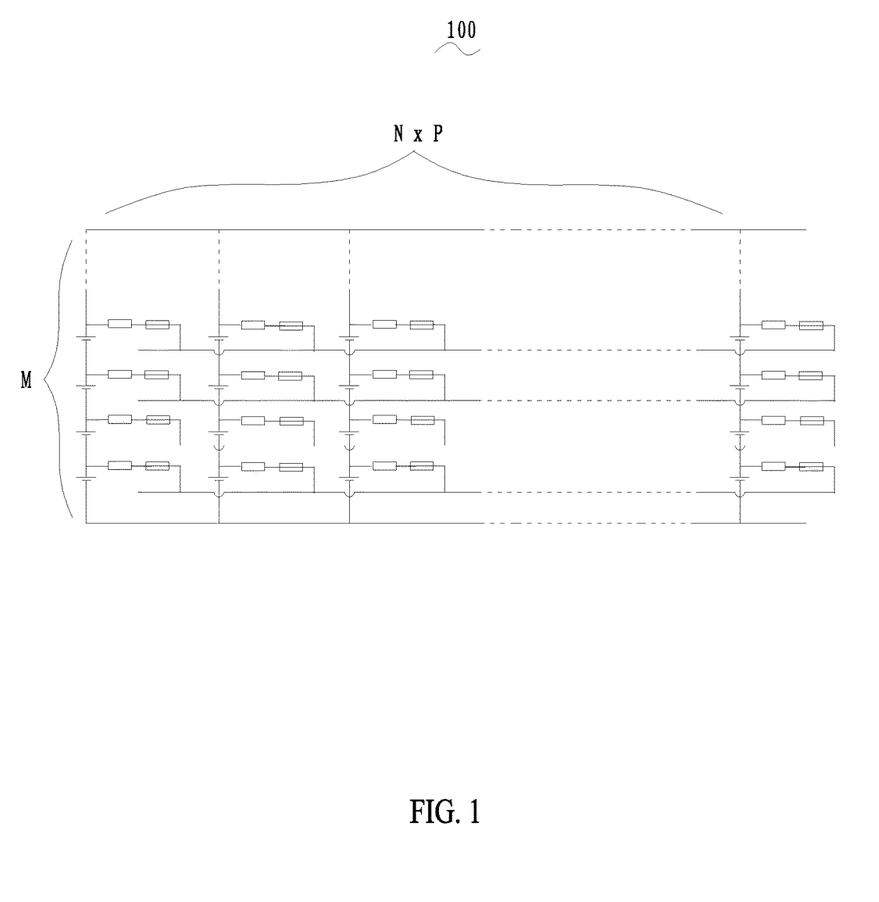
FIG. 1 is a circuit diagram of a power battery system, according to a first embodiment of the present invention.
Figure 2:
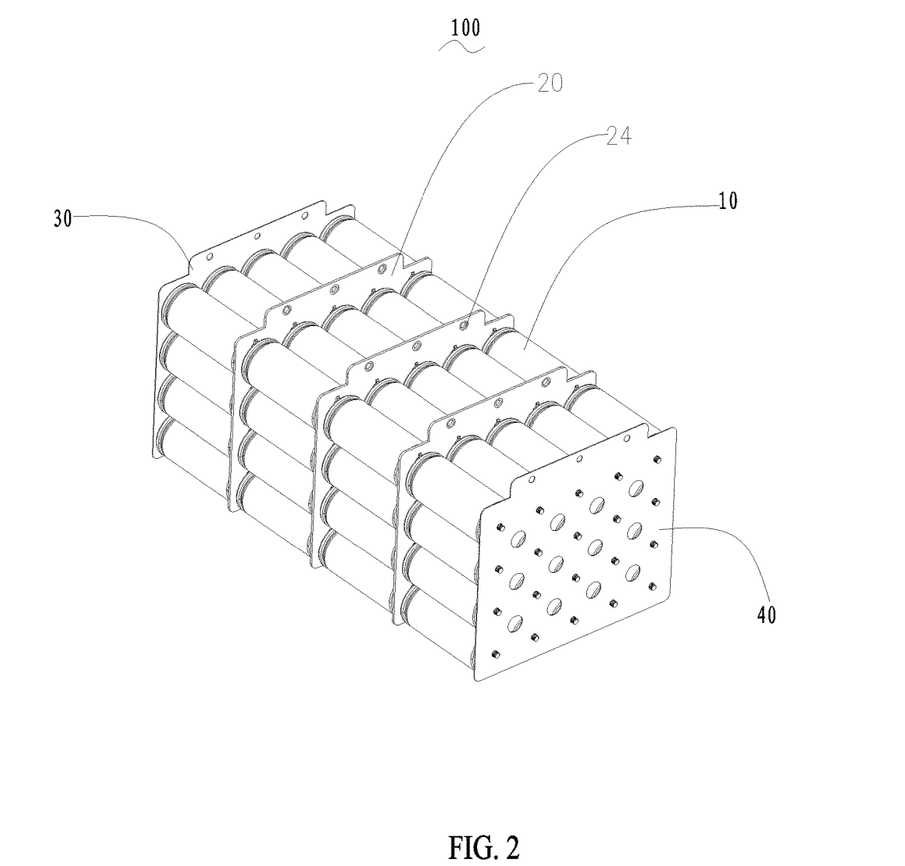
FIG. 2 is an isometric, schematic view of the power battery system of FIG. 1.
Figure 3:
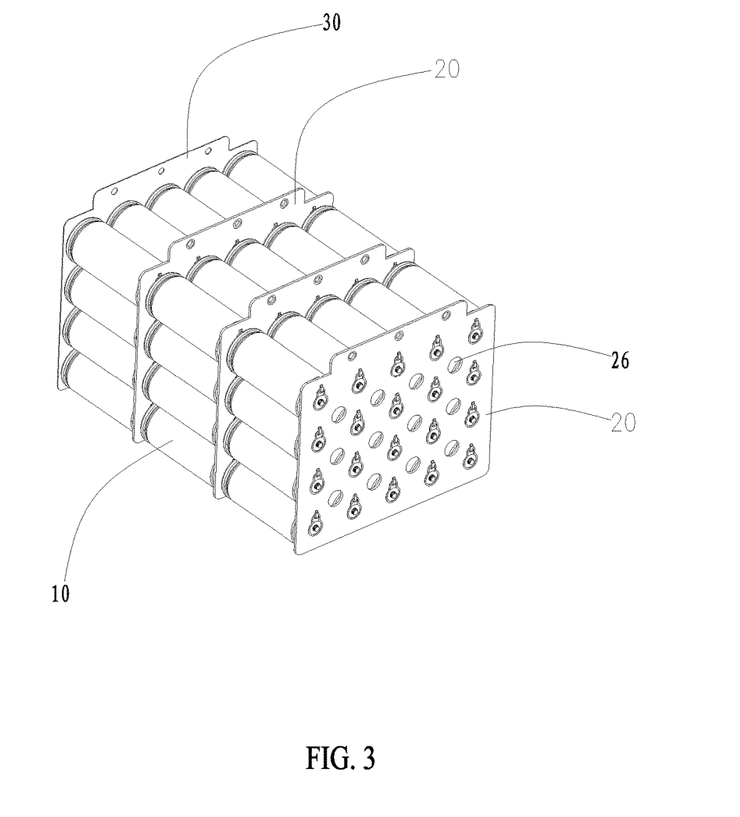
FIG. 3 is an isometric, schematic view of a part of the power battery system FIG. 2.

Referring to FIG. 1 to FIG. 3, a power battery system 100, according to a first embodiment, includes a number of single batteries 10. The power battery system 100 includes M parallel groups that are connected in series. Each of the M parallel groups includes a number of single batteries 10 connected in parallel. The single batteries 10 of each parallel group are arranged in a matrix including N rows each contains P batteries 10. Wherein, M presents the number of the parallel groups, N multiplies P presents the number of the single batteries 10 of each parallel group. In this embodiment, M is four, N is four, and P is five, namely the power battery system 100 includes four parallel groups that are connected in series. Each of the four parallel groups includes twenty single batteries 10 connected in parallel. In this embodiment, each single battery 10 is a lithium iron phosphate battery.

The power battery system 100 further includes a number of electrode board 20, a positive electrode board 30, and a negative electrode board 40. Each electrode board 20 is electrically connected between two neighbored parallel groups. In this embodiment, the power battery system 100 includes three electrode boards 20.

The positive electrode board 30 is electrically connected to the positive electrode of power battery system 100. The negative electrode board 40 is electrically connected to the negative electrode of the power battery system 100.

Figure 4:
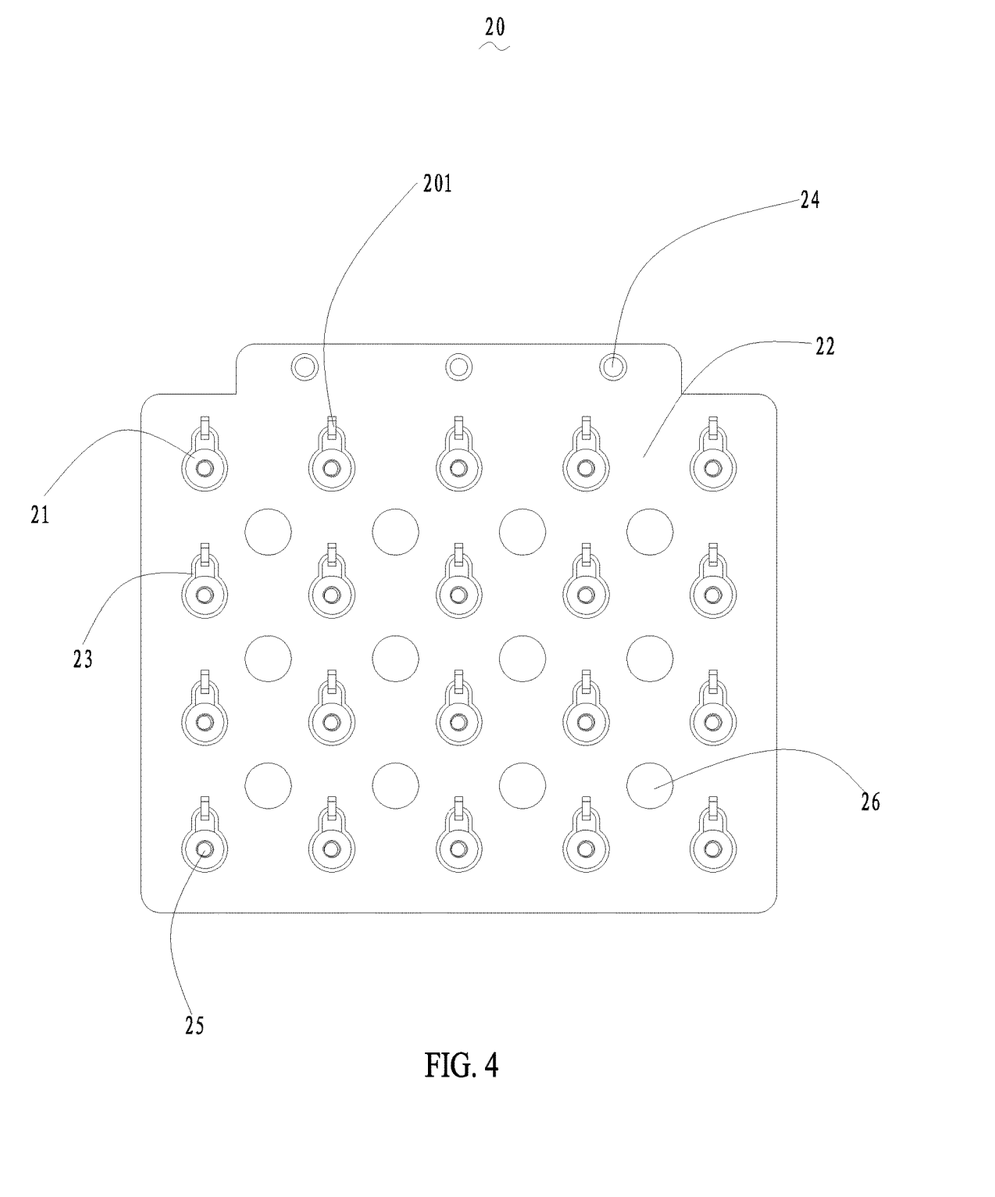
FIG. 4 is a front view of an electrode board of the power battery system FIG. 3.

Referring to FIG. 4, each of the improved electrode boards 20 is generally rectangular and includes a number of electrode contact plates 21, a conductive substrate 22, and a number of dielectric members 23. The electrode contact plates 21 and the conductive substrate 22 are preferably made of copper. The number of the electrode contact plates 21 is N multiplies P, which corresponds to that of the single batteries 10 of one parallel group. Each electrode contact plate 21 is configured for electrically connecting two neighbored single batteries 10 of two neighbored parallel groups in series. Each electrode contact plate 21 is generally in a cam shape and defines a through hole 25 passing through a middle portion of the corresponding electrode contact plate 21. Each electrode contact plate 21 can be electrically connected to the positive electrode or the negative electrode of each single battery 10. Each dielectric member 23 is made of dielectric material and generally annular and surrounds an electrode contact plate 21. Each electrode contact plate 21 is isolated from the conductive substrate 22 by a dielectric member 23.

Each improved electrode board 20 further includes a number of security devices 201. In this embodiment, each security device 201 is a fuse that is enclosed within the system. One end of each fuse is electrically connected to the conductive substrate 22, the other end is electrically connected an electrode contact plate 21. Therefore, each electrode contact plate 21 is electrically connected to the conductive substrate 22 through a fuse device 201. In this embodiment, fusing current of each fuse device 201 is about 0.5-20 amperes.

Each electrode board 20 defines a number of cable passage holes 24 at a margin portion thereof. The cable passage holes 24 are configured for passing through data cables (not show). The data cables are consisted of a part of management system for managing the power battery system 100.

Each electrode board 20 further defines a number of air passage holes 26 passing through the conductive substrate 22. The air passage holes 26 of each electrode board 20 are uniformly distributed as a matrix and correspond to air passage holes 26 of other electrode board 20.

The positive electrode board 30 and the negative electrode board 40 are made of rigid metal. In this embodiment, the positive 30 and the negative electrode board 40 can be made of metal having good electrical conductivity, preferably, are made of copper. Both the positive electrode board 30 and the negative electrode board 40 define cable passage holes 24 at corresponding positions. The cable passage holes 24 of the positive electrode board 30 and the negative electrode board 40 correspond to the passage holes 24 of each improved board 20.

Referring to FIG. 2 to FIG. 4, in this embodiment the power system 100 includes four parallel groups that are connected in series, a positive electrode board 30, a negative electrode board 40, and three electrode boards 20.

When assembling, the negative electrode of each single battery 10 of a first parallel group is electrically connected to the negative electrode board 40. The positive electrode of each single battery 10 of the first parallel group is received in a through hole 25 and electrically connected to an electrode contact plate 21 of a first electrode board 20. Therefore, the positive electrode of each single battery 10 of the first parallel group is electrically connected to the conductive substrate 22 of the first electrode board 20 via a security device 201. The negative electrode of each single battery 10 of a second parallel is connected to a corresponding positive electrode of the single battery 10 of the first parallel group by a nut, namely the nut electrically connects two neighbored single batteries 10 of the first parallel group and the second parallel group in series. The positive electrode of each battery 10 of the second parallel group is received in a through hole 25 and electrically connected to an electrode contact plate 21 of a second electrode board 20. Therefore, the positive electrode of each single battery 10 of the second parallel group is electrically connected to the conductive substrate 22 of the second electrode board 20 via a security device 201. The negative electrode of each battery 10 of a third parallel is connected to the positive electrode of the battery 10 of the second parallel group by a nut, namely the nut electrically connects two neighbored single batteries 10 of the second parallel group and the third parallel group in series. The positive electrode of each battery 10 of the third parallel group is received in a through hole 25 and electrically connected to an electrode contact plate 21 of a third electrode board 20. Therefore, the positive electrode of each single battery 10 of the third parallel group is electrically connected to the conductive substrate 22 of the third electrode board 20 via a security device 201. The negative electrode of each battery 10 of a fourth parallel is connected to the positive electrode of the battery 10 of the third parallel group by a nut, namely the nut electrically connects two neighbored single batteries 10 of the third parallel group and the fourth parallel group in series. The positive electrode of each battery 10 of a fourth parallel is connected to the positive electrode board 30. Therefore, the four parallel groups of batteries 10 are electrically connected in series.

After assembling, each electrode board 20 is arranged between two neighbored parallel groups. The positive electrode board 30 is connected to the positive electrode of the power battery system 100. The negative electrode board 40 is connected to the negative electrode of the power battery system 100.

In alternative embodiments, the number of the parallel groups is not limited in this embodiment, preferably, equal to four or more than four for satisfying a desirable voltage.

In use, when one single battery 10 of one parallel group short circuit, the current of the single battery 10 short circuit quickly increases, while the voltage of the single battery 10 short circuit quickly decreases. Therefore, the other single batteries 10 of this parallel group short circuit because of the single battery 10 short circuit. Each fuse device 201 electrically connected to a single battery 10 will fuse to protect the parallel group in which the single batteries 10 short circuit. The single battery 10 short circuit will not be charged by other batteries in the same group. Therefore, the battery system can be protected by the fuse devices 201.

Figure 5:
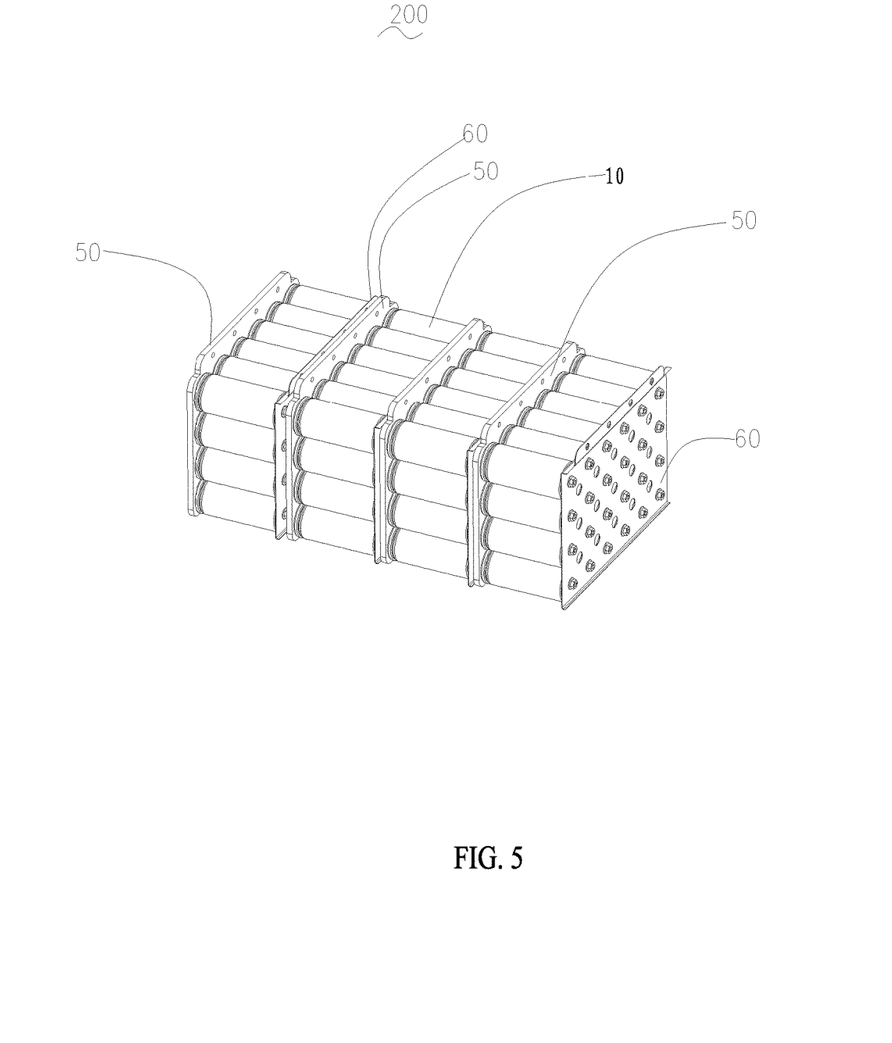
FIG. 5 is an isometric, assembled view of a power battery system, according to a second embodiment of the present invention.
Figure 6:
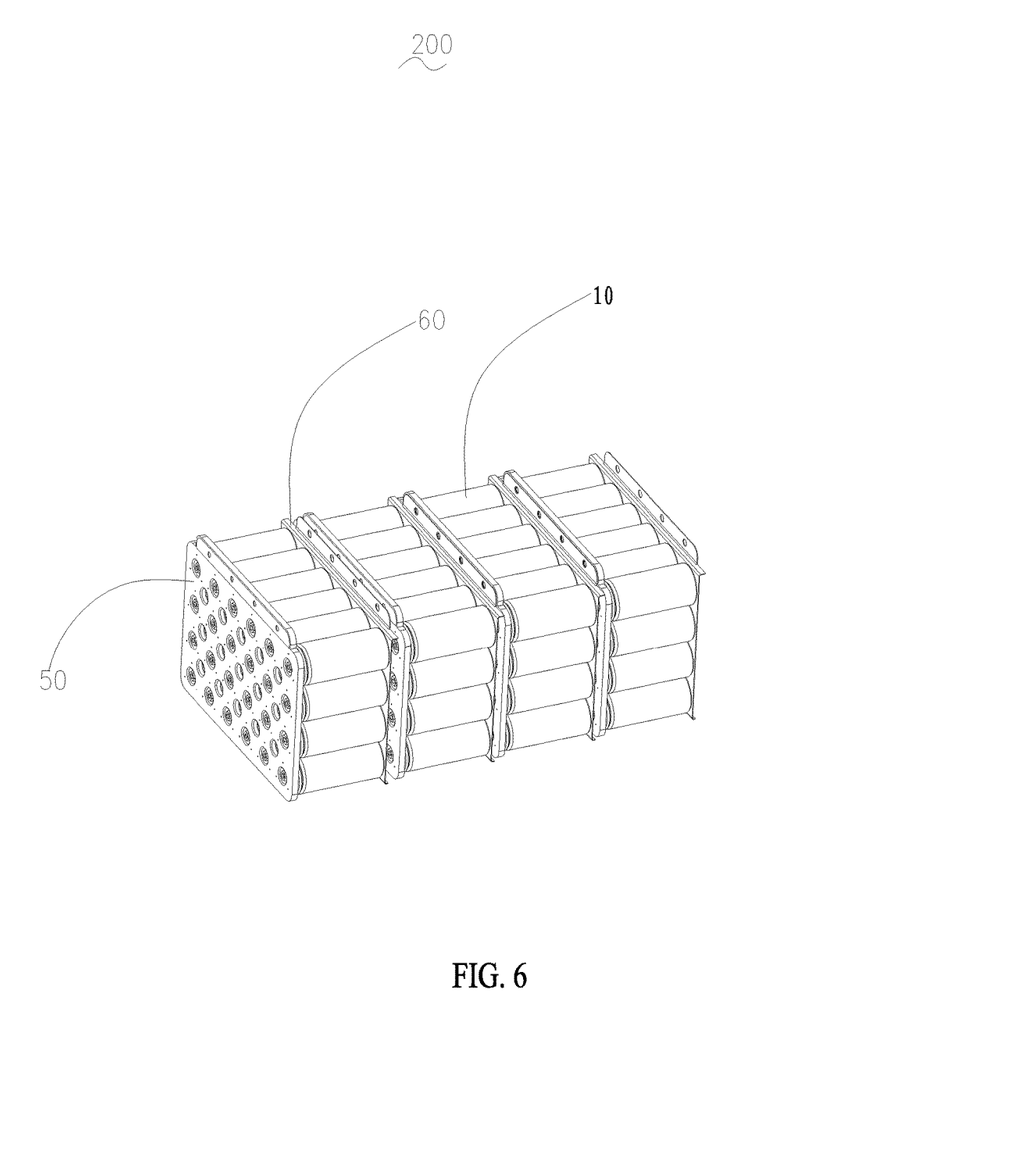
FIG. 6 is similar to FIG. 5, but view from another angle.

Referring to FIG. 5 and FIG. 6, a power battery system 200, according to a second embodiment, includes a number of single batteries 10. The power battery system 200 includes a number of parallel groups that are connected in series. Each of the parallel groups includes a number of single batteries 10 connected in parallel. In this embodiment, each of the positive electrode and the negative electrode of each single battery 10 is connected to a bolt (not shown) by melting.

The power battery system 200 further includes a number of electrode boards 50 and a number of ordinary electrode boards 60. In this embodiment the power system 200 includes four parallel groups that are connected in series, four electrode boards 50, and four ordinary electrode boards 60. The positive electrode of each single battery 10 of each parallel group is connected to an electrode board 50. The negative electrode of each battery 10 of each parallel group is connected an ordinary electrode board 60.

Referring to FIG. 7 to FIG. 9, FIG. 11 and FIG. 12, each electrode board 50 includes a base board 51 and two dielectric layers (not labeled) covered on two opposite surfaces of the base board 51. The two dielectric layers are made of anti-flaming material such as anti-flaming plastic. The base board 51 includes a number of electrode contact plates 511 and a conductive substrate 512. The electrode contact plates 511 and conductive substrate 512 are preferably made of copper. The electrode contact plates 511 are uniformly distributed on the conductive substrate 512 in a matrix. Each electrode contact plate 511 is generally discoideus and defines a through hole 516 for receiving the positive electrode or the negative electrode of a single battery 10. Each electrode contact plate 511 forms a receiving space 53 communicated with a correspond through hole 516. The receiving space 53 is configured for receiving a nut (not shown).

The conductive substrate 512 defines a number of segmented annular grooves 513. The number of the segmented annular grooves 513 corresponds to that of the electrode contact plates 511 of each base board 51. Each segmented annular groove 513 is defined between the conductive substrate 512 and an electrode contact plate 511 and surrounds an electrode contact plate 511. The conductive substrate 512 is electrically connected to each electrode contact plate 511 through three electric connection arms 514. The three electric connection arms 514 compose a security device. The three electric connection arms 514 are uniformly distributed in each segmented annular groove 513 to divide each segmented annular groove 513 into trisection. Each electric connection arm 514 defines a concaved groove 515. In this embodiment, the fusing current of one of the three electric connection arms 514 is less than that of other two electric connection arms 514. In this embodiment, the electrode contact plates 511, the conductive substrate 512, and the electric connection arms 514 are integrated formed by stamping.

Figure 10:
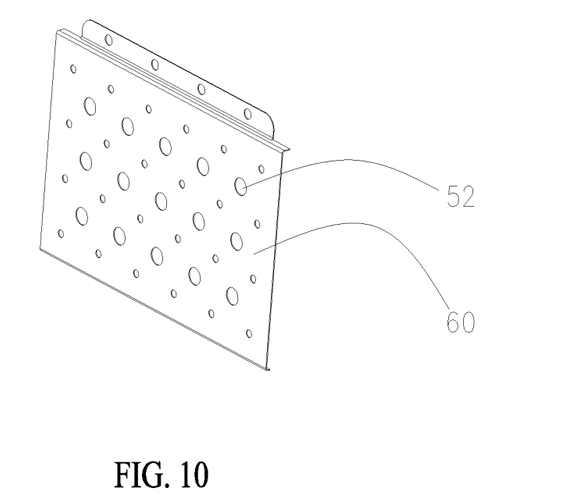
FIG. 10 an isometric schematic view of an ordinary electrode board of the power battery system of FIG. 5.

Referring to FIG. 10, the shape of each ordinary electrode board 60 is similar to each electrode board 50. Each ordinary electrode board 60 is made of metals which have good conductive property. In this embodiment, each ordinary electrode board 60 is preferably made of copper. Both each electrode board 50 and each ordinary electrode board 60 define a number of air passage holes 52 passing through each electrode board 50 and each ordinary electrode board 60. The air passage holes 52 of each electrode board 50 are arranged in a matrix. The air passage holes 52 of each ordinary electrode board 60 are corresponded to the air passage holes 52 of each electrode board 50 to form air passage channels between all of the electrode board 50 and all of the ordinary electrode board 60 when the power battery system 200 is assembled.

Figure 7:
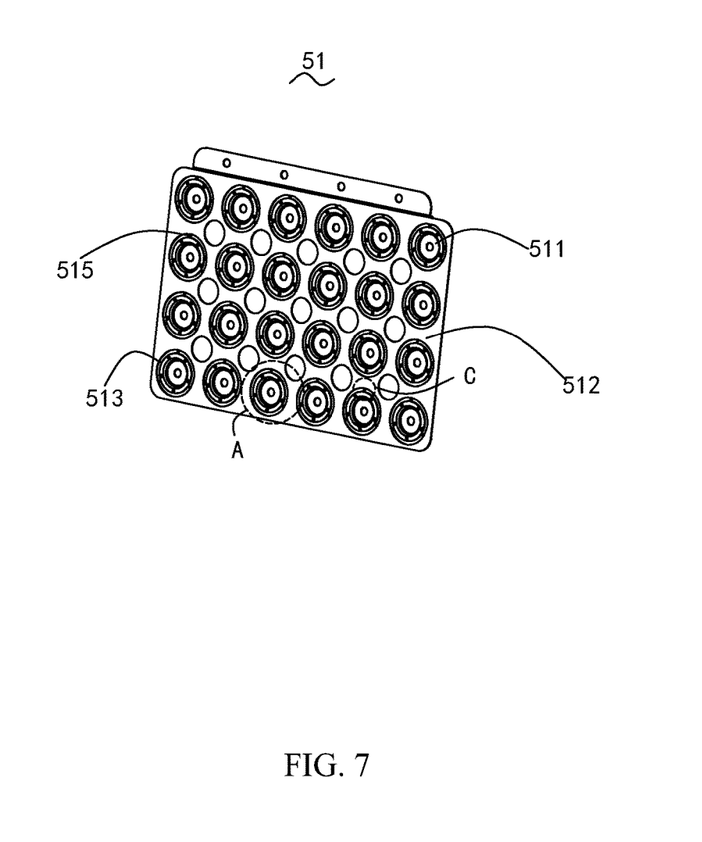
FIG. 7 is an isometric, schematic view of a base board of an electrode plate of the power battery system of FIG. 5 view from one surface of the electrode plate.

Referring to FIG. 5 to FIG. 7, in this embodiment the power system 200 includes four parallel groups that are connected in series, each of the four parallel groups includes four rows each contains six single batteries 10, namely twenty-four single batteries 10 connected in parallel.

When assembling the battery system 200, the negative electrode of each single battery 10 of a first parallel group is electrically connected to one of a first ordinary electrode board 60. A nut is received in a corresponding receiving space 53. The positive electrode of each single battery 10 of the first parallel group is passed through a through hole 516 and electrically connected to an electrode contact plate 511 of a first improve electrode board 50. The positive electrode of each single battery 10 of the first parallel group engages the nut. Therefore, the positive electrode of each single battery 10 of the first parallel group is electrically connected to the conductive substrate 512 of the first improved electrode board 50 via three electric connection arms 514. A second ordinary electrode board 60 is attached to the first electrode board 50. The negative electrode of each single battery 10 of the second parallel group is passed through the second ordinary electrode board 60 and electrically connected to the second ordinary electrode board 60 and further electrically connected to the nut, namely the nut electrically connects two neighbored single batteries 10 of the first parallel group and the second parallel group in series. Therefore, the second ordinary electrode board 60 is electrically connected to the first electrode board 50 through the negative electrode of each single battery 10 of the second parallel group and each nut. The assembling processes of the other parallel groups are similar to the first parallel group.

After assembling, all of parallel groups of batteries 10 are connected in series. An electrode board 50 is electrically connected to the positive electrode of the battery system 200. An ordinary electrode board 60 is connected the negative electrode of the battery system 200. An ordinary electrode board 60 and an improved electrode board 50 are electrically connected between two neighbored parallel groups.

Figure 11:
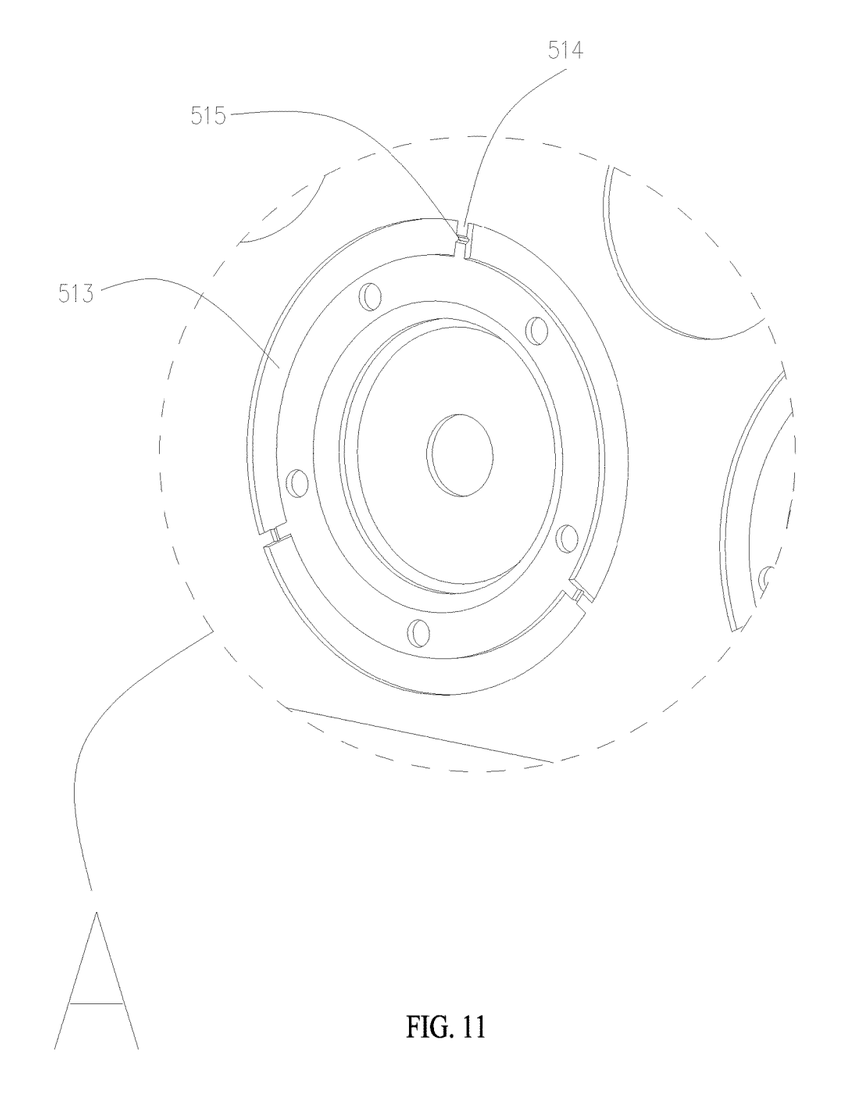
FIG. 11 is an enlarged view of portion A of FIG. 7.
Figure 12:
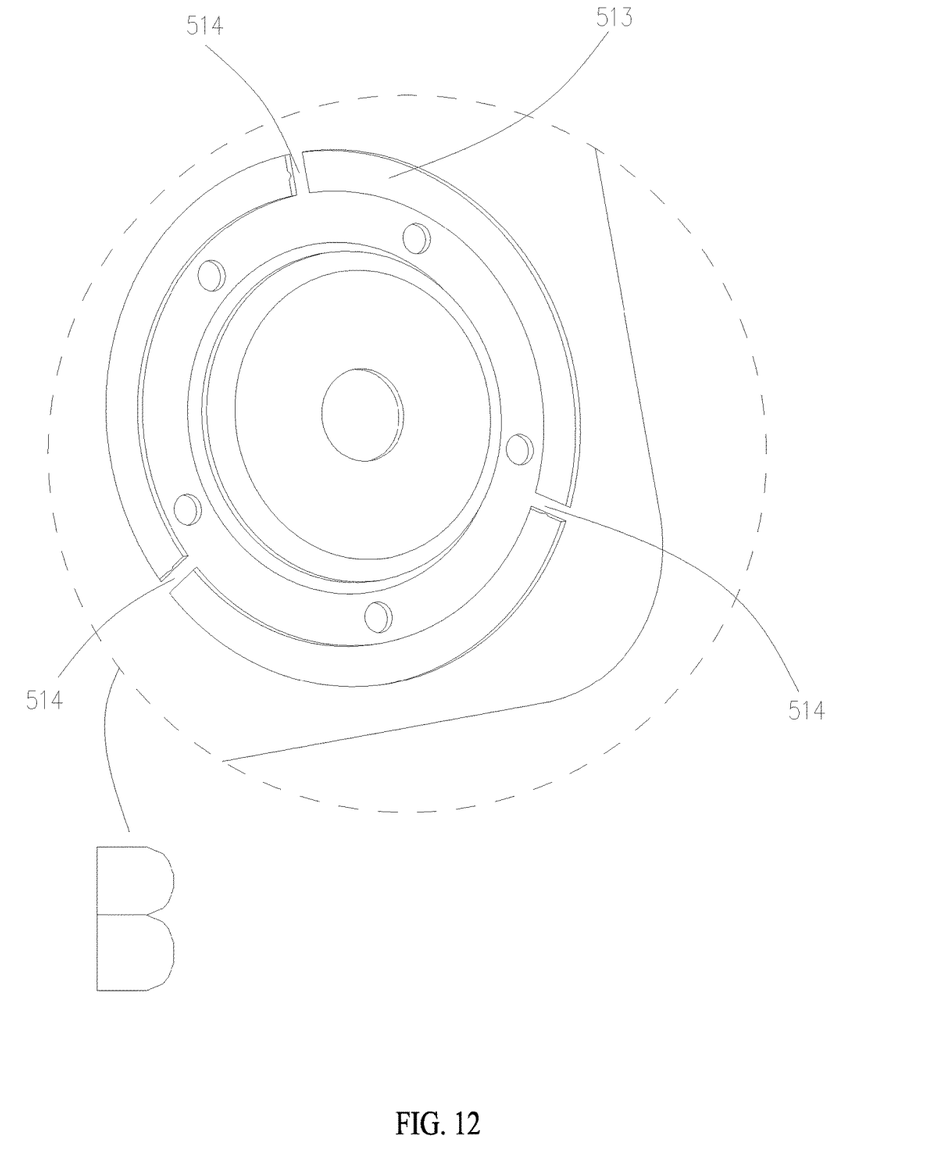
FIG. 12 is an enlarged view of portion B of FIG. 8.
Figure 13:
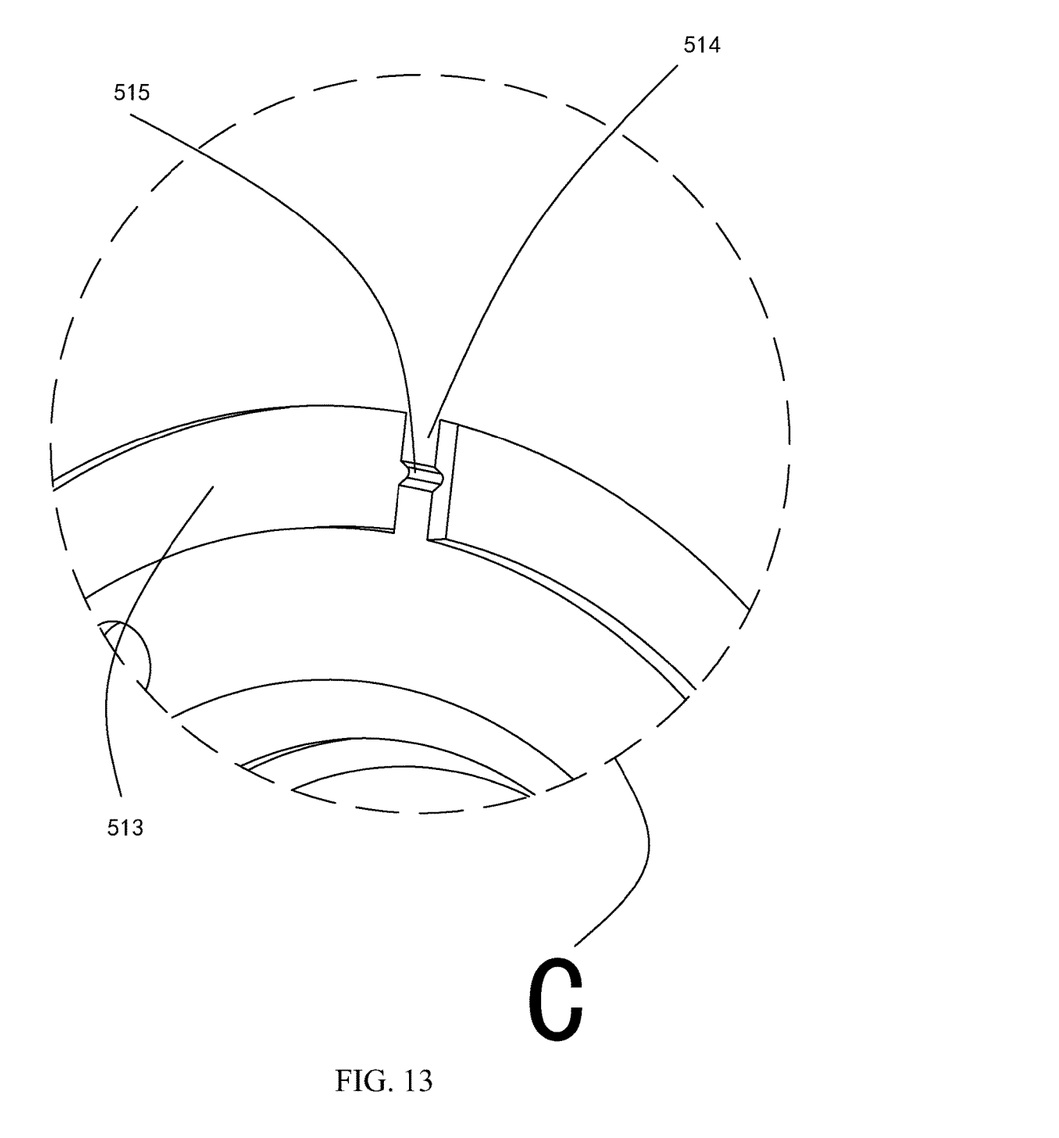
FIG. 13 is an enlarged view of portion C of FIG. 7.

In use, when one single battery 10 of a parallel group short circuit, the current of the single battery short circuit quickly increases, while the voltage of the single battery short circuit quickly decreases. Therefore, the other single batteries 10 of the parallel group short circuit because of the single battery 10 short circuit. The currents pass through the three electric connection arms 514 connected to an electrode contact plate 511 and the conductive substrate 512 quickly increases, resulting of the electric connection arm 514 having fusing current less than that of the other two electric connection arms 514 firstly fuse. Then the other two electric connection arms 514 will fuse for currents increasing. The single battery 10 short circuit will not be charged by other single batteries 10 of the same parallel group. Therefore, the power battery system 200 can be protected by the security devices, each of which is consisted of three electric connection arms 514.

Figure 8:
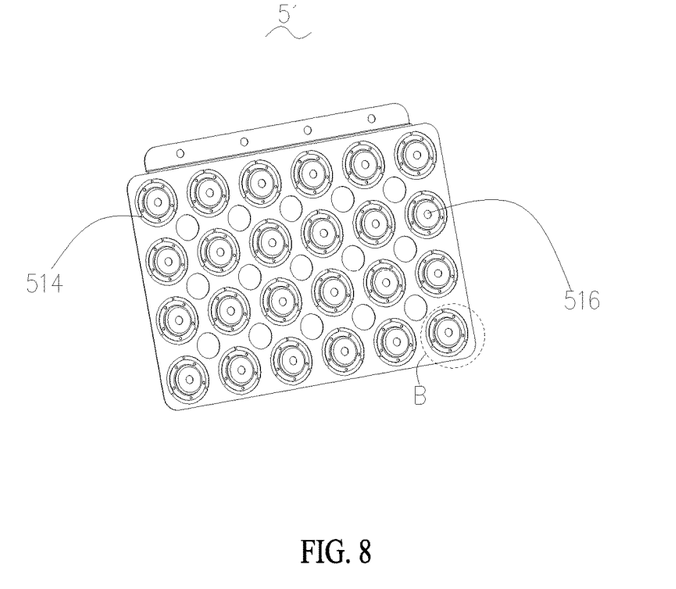
FIG. 8 is similar to FIG. 7, but view from another angle of the other surface of the electrode plate.
Figure 9:
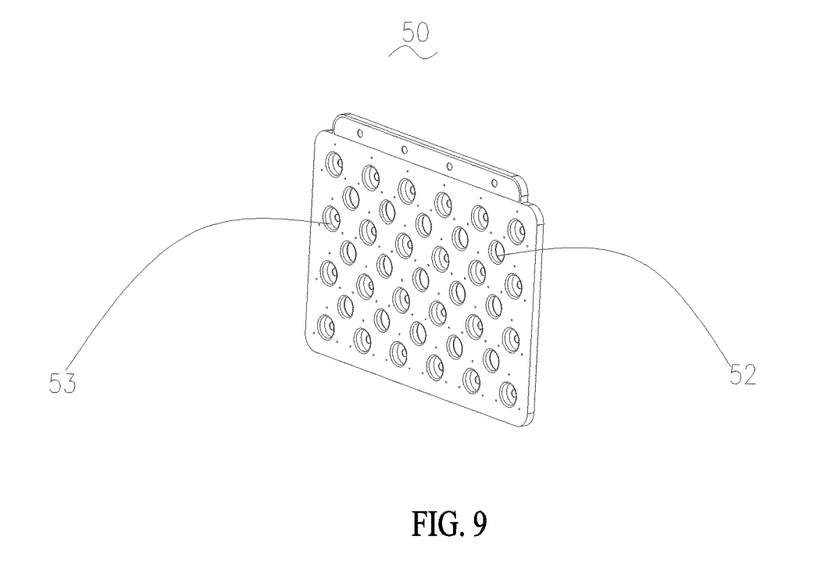
FIG. 9 an isometric schematic view of the electrode board of the power battery system of FIG. 5.

In this embodiment, the conductive substrate 512 further defines a number of tiny latching holes (not labeled) passing through the conductive substrate 512. The dielectric layers covered on the two opposite surfaces by heating dielectric material in to the melted state and then covered on the two opposite surfaces. A part of the dielectric material filled into the latching hole to enhance binding force between the conductive substrate 512 and the dielectric material.

In this embodiment, when the power battery system is applied in an automobile such as a car or a bus, an ordinary electrode board 60 and an electrode board 50 electrically connected between two neighbored parallel groups can provide anti-vibration effect.

It will be apparent to those skilled in the art that various modification and variations can be made in the multicolor illumination device and related method of the present invention without departing from the spirit or scope of the invention. Thus, it is intended that the present invention cover modifications and variations that come within the scope of the appended claims and their equivalents.

What is claimed is:

1. A power battery system, comprising:
a number of parallel groups that being connected in series, each of the parallel groups comprising a number of single batteries connected in parallel;
a number of electrode boards, each of the electrode boards being electrically connected between two neighbored parallel groups;
wherein each of the electrode boards comprises a number of electrode contact plate, a conductive substrate, and a number of security devices; each electrode contact plate is configured for being electrically connected to two neighbored single batteries of the two neighbored parallel group in series; each of the security devices corresponds to an electrode connection plate and electrically connects an electrode connection plate to the conductive substrate; each of the security devices fuses when one of the single battery occurs short circuit, wherein the power battery system further comprises a number of dielectric members made of dielectric material; each of the dielectric members is annular and surrounds an electrode contact plate; each electrode contact plate is isolated from the conductive substrate by a dielectric member.

2. The power battery system of claim 1, wherein each of the security devices is a fuse that is enclosed within the system.

3. The power battery system of claim 2, wherein fusing current of the fuse is about 0.5-20 amperes.

4. The power battery system of claim 1, further comprise a positive electrode board being configured to electrically connect to the positive electrode of the power battery system and a negative electrode board being configured to electrically connect to the negative electrode of the power battery system.

5. The power battery system of claim 1, wherein each of the electrode board defines a number of air passage holes passing through the conductive substrate; the air passage hole are uniformly distributed in a matrix; each electrode board defines a number of cable passage holes at a margin portion for passing through data cables.

6. The power battery system of claim 1, wherein the number of the parallel groups is equal or greater than four; each of the parallel groups comprises four rows each contains five single batteries connected in parallel.

* * * * *